(12) United States Patent
Dattatreya

(10) Patent No.: US 9,054,926 B1
(45) Date of Patent: Jun. 9, 2015

(54) RECEPTION OF PHASE-SHIFTED SIGNAL SEQUENCES IN DIVERSITY RECEPTION

(71) Applicant: Galigekere Ramaswamy Dattatreya, Colorado Springs, CO (US)

(72) Inventor: Galigekere Ramaswamy Dattatreya, Colorado Springs, CO (US)

(73) Assignee: Mitre Corporation, McLean, VA (US)

( * ) Notice: Subject to any disclaimer, the term of this patent is extended or adjusted under 35 U.S.C. 154(b) by 0 days.

(21) Appl. No.: 14/224,996

(22) Filed: Mar. 25, 2014

(51) Int. Cl.
*H04L 27/227* (2006.01)
*H04L 27/26* (2006.01)

(52) U.S. Cl.
CPC ........ *H04L 27/2275* (2013.01); *H04L 27/2613* (2013.01)

(58) Field of Classification Search
CPC ..................... H04L 2209/12; H04L 25/03866; H04L 25/4902; H04L 27/0004; H04L 27/02; H04L 27/2042; H04L 27/2278; H04L 27/2647; H04L 9/08; H04L 9/14; H04L 1/005; H04L 1/0057; H04L 2001/0097; H04L 2025/0341; H04L 27/2275; H04L 25/022; H04L 25/0226; H04L 25/023; H04L 27/2613; H04L 27/2656; H04L 27/2657; H04L 27/266; H04L 27/2662; H04L 5/0007; H04L 5/0021; H04L 5/0048; H04B 1/70752; H04B 1/708; H04B 1/707; H04B 1/126; H04B 1/7085; H04B 10/505; H04B 10/6161; H04B 10/6165; H04B 1/7163; H04B 10/25133; H04B 10/611; H04B 10/612; H04B 10/6162; H04B 1/7075
See application file for complete search history.

(56) References Cited

U.S. PATENT DOCUMENTS

| | | | |
|---|---|---|---|
| 5,311,523 A | 5/1994 | Serizawa et al. | |
| 7,050,001 B2 | 5/2006 | Buchler | |
| 8,059,698 B2 * | 11/2011 | Mester et al. | 375/150 |
| 8,301,037 B2 | 10/2012 | Pfau | |
| 8,654,911 B2 * | 2/2014 | Van Nee | 375/347 |
| 8,675,754 B1 * | 3/2014 | Yonge et al. | 375/261 |
| 2003/0012267 A1 * | 1/2003 | Jitsukawa et al. | 375/148 |
| 2004/0120424 A1 * | 6/2004 | Roberts | 375/327 |
| 2004/0143615 A1 * | 7/2004 | Yomo et al. | 708/300 |
| 2005/0163238 A1 * | 7/2005 | Fujii | 375/260 |
| 2006/0062196 A1 * | 3/2006 | Cai et al. | 370/345 |
| 2007/0165488 A1 * | 7/2007 | Wildey | 367/101 |
| 2009/0034589 A1 * | 2/2009 | Hahm et al. | 375/150 |
| 2010/0189163 A1 * | 7/2010 | Burgi et al. | 375/142 |
| 2011/0002366 A1 * | 1/2011 | Michaels et al. | 375/148 |
| 2011/0122032 A1 * | 5/2011 | Sakata et al. | 343/703 |
| 2011/0200126 A1 | 8/2011 | Bontu et al. | |
| 2013/0230312 A1 * | 9/2013 | Randel et al. | 398/25 |
| 2013/0315342 A1 * | 11/2013 | Um et al. | 375/295 |

OTHER PUBLICATIONS

Colavolpe, G., et al., Noncoherent Sequence Detection in Frequency Nonselective Slowly Fading Channels, IEEE Journal on Selected Areas in Communications, vol. 18, No. 11, Nov. 2000 pp. 2302-2311.
Wong. S.Y., et al., Multihop Localization with Density and Path Length Awareness in Non-Uniform Wireless Sensor Networks, 5 pages, IEEE 2005.
Wu, M., et al., Sequence Detection on Fading Channels without Explicit Channel Estimation, Wireless VITAE '09, pp. 370-374.

* cited by examiner

*Primary Examiner* — Hirdepal Singh
(74) *Attorney, Agent, or Firm* — Proskauer Rose LLP

(57) ABSTRACT

During transmission of a signal, a decoder receives a data symbol sequence and one or more copies of the data symbol sequence. The data symbol sequence and each of the copies have unknown noise, including unknown phase shifts. The unknown phase shifts are estimated such that the data symbol sequence that was transmitted is substantially recovered.

8 Claims, 4 Drawing Sheets

RECEPTION OF PHASE-SHIFTED SIGNAL SEQUENCES IN DIVERSITY RECEPTION

TECHNICAL FIELD

The invention relates generally to wireless communications. Specifically, the invention relates to transmission and reception of signals received over degraded communication channels.

BACKGROUND

Digital wireless communication can be described as a class of methods used to transmit data (or message) in the form of numbers and/or symbols from a source point and receive the data at a remote destination point. Many satellite, airborne, and terrestrial wireless systems use a digital form of communication. The digital form of communication can require that the data be transformed into symbols. The set of symbols typically used is usually small, e.g., consisting of two, four, or eight different symbols.

A larger volume of data can be represented as an ordered group (i.e., a sequence) of symbols. Each data symbol can be represented as one or more physical quantities at different points in a circuit chain of a transmitter, through a medium of air and/or free space, and in a circuit chain of a receiver, until the data is converted back to a data symbol. Some of the physical quantities can be functions over a time period.

In particular, through the medium, a data symbol can take the form of an electromagnetic wave lasting over a symbol with a particular frequency, strength, and a starting phase angle. The medium and the electromagnetic spectral band used can be together known as the communication channel. Throughout the communication system, many of the intermediate quantities corresponding to a symbol can be called signals to distinguish them from the data symbol.

These signals can experience deterministic and nondeterministic transformations as they advance from one point to the next. When the signal arrives at the receiver circuit chain, it is usually corrupted by noise and/or other forms of interference. Such interferences are examples of nondeterministic transformations that communication signals experience. The extent of interference can also be known as the level of degradation of the channel. Interference can be intentional or unintentional. Jamming a communication system by directing electromagnetic energy at the receiving antenna is an example of interference intended to disrupt communication. A channel affected by intentional interference is also known as a contested channel.

Wireless communication typically uses forward error correction (FEC) encoding to combat interference and improve the reliability (or probability) of recovering (or reconstructing) the transmitted message. FEC encoding can introduce redundant symbols (that are functions of the original data symbols) at the transmitter and typically uses a corresponding decoding scheme at the receiver. The ratio of the number of original data symbols to the total number of original plus redundant symbols is known as the coding rate. Half and one third rate FEC are common. An additional technique to improve the recovery of the original message to be transmitted over a degraded channel is to transmit multiple copies of symbols (e.g., copies of FEC encoded symbols) interspersed over a time period. A simple reasoning of how this can improve the probability of recovering the symbol is that at least one of the copies may escape interference or may be only mildly affected by interference. Such a communication method is said to use "repeat codes." Repeating FEC encoded symbols can reduce the overall coding rate. At the receiver, signals corresponding to multiple copies of a symbol should be properly combined. In an example, let the FEC encoded data symbols needed to be transmitted be:

1, 4, 2, 2, 3, 1

At some points in the communication system, signals corresponding to a symbol can be complex numbers. In this example, let the signals corresponding to the above six symbols be the following complex numbers:

1, −i, i, i, −1, 1 at the transmitter. In the above, i denotes the unit imaginary part $$\sqrt{-1}$$

of complex numbers. This transformation from the symbols to the signals is an example of the quadrature phase shift keying (QPSK) modulation scheme.

Let the transmitter transmit the above symbol sequence two different times in the "repeat codes" mode. The signals can experience deterministic and nondeterministic transformations as they advance through the communication system. Let the original sequence of signals be multiplied by the complex number 0.98+0.19i. The resulting signals after this transformation are:

0.98+0.19i, 0.19−0.98i, −0.19+0.98i, −0.19+0.98i, −0.98−0.19i, 0.98+0.19i at some point in the receiver. Let the copy of the signals experience a slightly different transformation and be multiplied by the complex number 0.92+0.39i instead of being multiplied by the earlier factor 0.98+0.19i. The resulting signal sequence of the repeated transmission after this transformation is:

0.92+0.39i, 0.39−0.92i, −0.39+0.92i, −0.39+0.92i, −0.92−0.38i, 0.92+0.39i

In addition to such transformations, let the signals at the receiver be corrupted by noise over and above the transformations. Let the resulting transformed and noisy signals for the original and the repeat transmissions be 0.80+0.16i, 0.24−1.04i, −0.38+0.92i, −0.34+1.11i, −0.79−0.24i, 1.10+0.33i and 0.87+0.31i, 0.53−0.89i, −0.43+1.05i, −0.24+0.86i, −0.83−0.45i, 0.77+0.32i respectively. In this example, combining the two received signals sequences can be accomplished by averaging the two complex signal sequences. The resulting combined signal sequence is:

0.84+0.24i, 0.38−0.97i, −0.41+0.99i, −0.29+0.99i−0.81−0.35i, 0.94+0.33i rounded off to two decimal places.

In the above example, the multiplication of the signal sequence corresponding to the original transmission by the complex number 0.98+0.19i and the multiplication of the signal corresponding to the repeat transmission by the complex number 0.92+0.39i can be due to the phase shifts that the signal sequences experience.

The phase shifts are examples of the above mentioned deterministic transformations in the sense that all the signals in a sequence are multiplied by the same complex number and the receiver can "anticipate" that such a multiplication takes place. It is a nondeterministic transformation in the sense that the receiver may not know the exact complex number that the signal sequence gets multiplied by. In some communication system, the circuits in the receiver can track these phase shifts fairly accurately and make the needed correction. Examples of conditions that can facilitate accurate phase tracking are (1) constant carrier frequency, (2) strong direct communication path and negligible multipath reflections of the electromagnetic waves reaching the receiver, (3) good atmospheric conditions contributing to the stability of the carrier frequency phase angle, and/or (4) adequate signal to noise ratio (SNR). Under these conditions, a system can transmit reference symbols of known values only occasionally to help the receiver with accurate phase tracking. The receiver knows the locations and values of reference symbols and uses the corresponding signals for phase tracking.

Examples of systems that do not operate with such favorable features are (1) frequency hopped systems that change the carrier frequency frequently to avoid being intercepted and also to reduce the level of channel degradation caused by narrow band jammers, and/or (2) systems operating with possible multipath receptions, with multiple antennas, and over a degraded channel. Many such systems are designed to transmit reference symbols frequently. One problem is that the reference symbols are also corrupted by noise and an estimate of the phase shift computed with the use of reference signals only can be inaccurate. Data signals carry some information about the phase shift and the receiver can use them in conjunction with the reference signals to improve the accuracy of phase shift estimation.

The problem of estimation of phase shift is compounded if the receiver can combine multiple copies of an original transmission. Systems that incorporate systematic repeat codes are not the only ones in which the receiver can take advantage of combining. There are communication systems that operate with a data link protocol in which a receiver requests a repeat if an originally received signal sequence could not be successfully converted to data symbols. Ordinarily, the receiver discards the original reception and processes only the repeated version. A proper combining of the multiple copies can be a better option. Systems that use multiple antennas can also take advantage of combining the multiple copies received from multiple antennas arising out of a single transmission.

The process of determination of symbol decisions from the received signals can be called data symbol detection (or just "detection"). Phase shift estimation and detection can be treated as a joint problem to improve the probability of correct detection and it is desirable to do so.

SUMMARY

In one aspect, the invention involves a method of detecting a data symbol sequence transmitted over a wireless communications channel. The method involves receiving, by a detector in a receiver, a plurality of data signal sequence copies. Each data signal sequence copy includes a plurality of data symbols and data-symbol phase angles, a reference signal including at least one reference symbol, and noise, and includes an unknown phase shift, wherein the data signal is approximately identical for each copy and the unknown phase shift unknown for each copy. The method also involves generating, by the detector, an initial phase vector for each data symbol, each initial phase vector is based on the plurality of data signals for one data symbol present in the plurality of signal sequence copies. The method also involves generating, by the detector, an estimated symbol detection sequence for each initial phase vector. The method also involves generating, by the detector, a quality value for each estimated symbol detection sequence. The method also involves selecting, by the detector, a global estimated phase vector, the global estimated phase vector is the estimated phase vector for the estimated symbol detection sequence having a quality value that is the highest of all quality values. The method also involves detecting, by the detector, the data symbol sequence by a) phase shifting each of the plurality of data signal sequence copies based on the global estimated phase vector, and b) combining each of the phase shifted plurality of data signal sequence copies to obtain the data symbol sequence.

In some embodiments, the method also involves iteratively updating each estimated symbol detection sequence and each estimated phase vector until each estimated phase vector is identical to a corresponding estimated phase vector of an earlier iteration.

In some embodiments, the data symbol sequence comprises a repeat code from one transmitter. In some embodiments, the data symbol sequence comprises a one-hop portion of a signal transmitted over a frequency-hopping communications channel. In some embodiments, the detector comprises a field-programmable gate array. In some embodiments, the data symbol sequence comprises a repeat code from multiple transmitters. In some embodiments, the bit error rate of the global estimated symbol detection sequence is below $10^{-5}$.

In some embodiments, the method involves decoding, by a decoder receiving the combined symbol sequence from the detector, the combined symbol sequence using hard decision decoding.

In some embodiments, the method involves decoding by a decoder that can get soft decision inputs, the soft decisions being the combined signal sequence from the detector.

Advantages of exemplary embodiments include enabling a detector or detection circuit in a receiver to more efficiently combine received phase-shifted signals. Using approximately identical data signals included in multiple copies of a received symbol sequence signal, the detector can efficiently determine unknown phase errors added to each of transmitted copies when traversing the communications channel. Additional advantages include efficient combination of received copies of the transmitted signal to decrease the bit error rate of the communications system's transmission. Additional advantages include enabling the communications systems to more readily use non-coherent transmission schemes and conduct frequency hopping techniques with shorter dwell times for each hop.

BRIEF DESCRIPTION OF THE DRAWINGS

In order to better understand various exemplary embodiments, reference is made to the accompanying drawings wherein.

DETAILED DESCRIPTION

Figure 1:
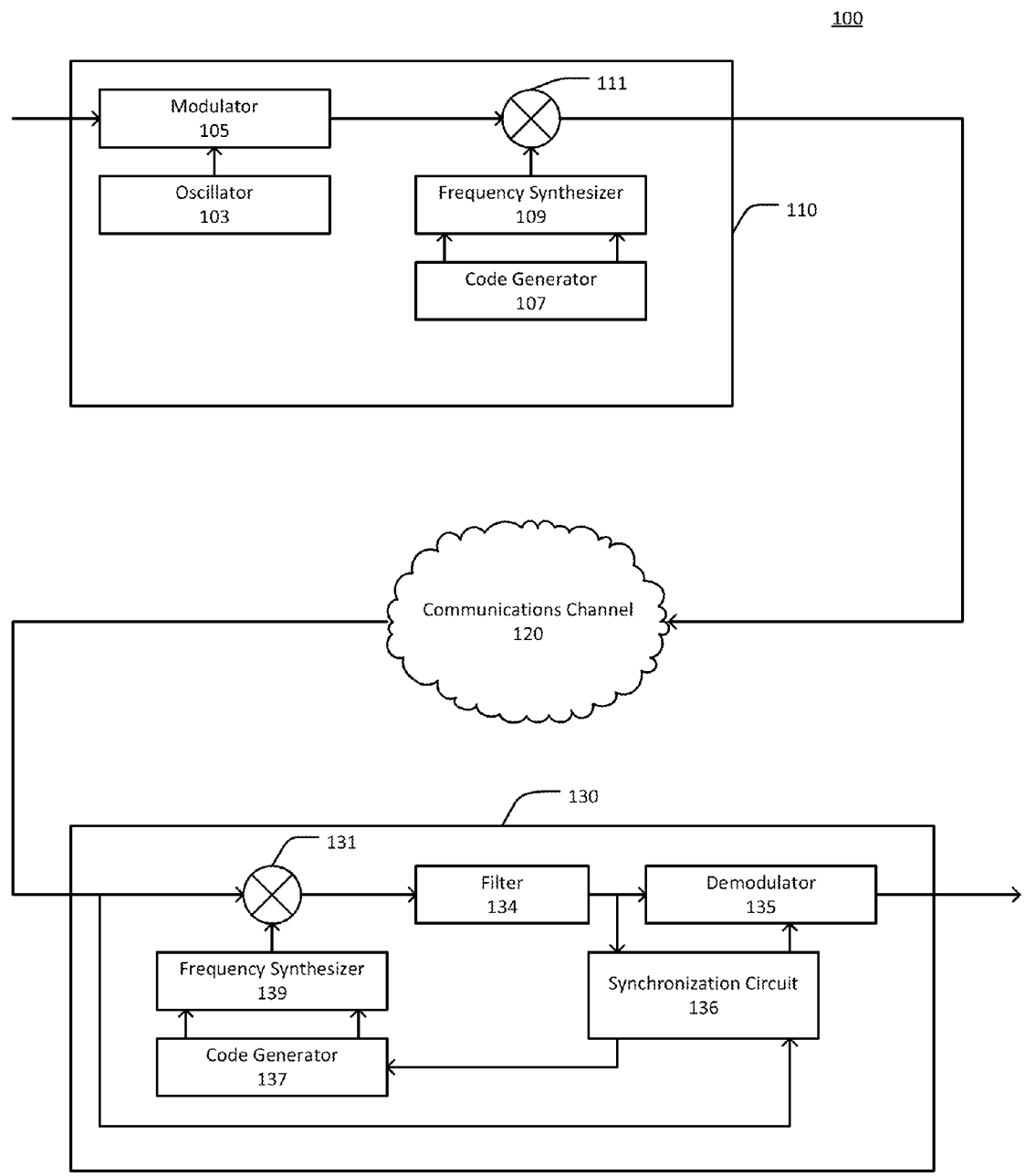
FIG. 1 illustrates an exemplary communications system including a receiver that receives one or more copies of a signal sequence, according to an illustrative embodiment of the technology.

FIG. 1 illustrates an exemplary communications system 100 that includes a receiver 130 that receives one or more copies of a data symbol sequence signal (e.g., a code repetition signal). The communications system 100 includes a transmitter 110, a receiver 130, and a communications channel 120.

Transmitter 110 includes an oscillator 103, a modulator 105, a code generator 107, a frequency synthesizer 109, and a mixer/multiplier 111. Each of these components of the transmitter 110 can be hardware, such as individual processors, semiconductors, field-programmable gate arrays (FPGAs), application-specific integrated circuits (ASICs) and/or other circuits. In various embodiments, the transmitter 110 is a mobile device or a fixed communications device (e.g., an antenna, phone, computer, satellite, etc.). As is apparent of one of ordinary skill in the art, transmitter 110 is exemplary and can be substituted with any suitable transmitter known in the art. The transmitter 110 receives an input signal (e.g., an analog or digital signal) and outputs a signal sequence representing a symbol sequence.

The modulator 105 receives the input signal. The modulator 105 is in communication with the oscillator 103. The modulator 105 receives a base frequency from the oscillator 103. The modulator 105 produces a combined signal based on the input signal and the combined signal having the base frequency. The modulator 105 can modulate the signal through various methods known in the art, such as, for example, phase-shift keying (PSK), frequency-shift keying (FSK), amplitude-shift keying (ASK), minimum-shifting keying (MSK), and/or other forms of continuous-phase modulation (CPM). In one embodiment, the modulator 105 modulates the input signal based on quadrature phase-shift keying (QPSK). In such instances, the combined signal has a data rate that is higher than the data rate as the input signal within the same bandwidth as the input signal, as the combined signal is concentrated around four phases uses by the modulator 105.

The modulator 105 outputs the combined signal. The modulator is in communication with the mixer 111. The mixer 111 takes as input the combined signal. The mixer 111 is also in communication with the frequency synthesizer 109. The mixer 111 determines the symbol sequence signal based on the input signal and the output of the frequency synthesizer 109. The mixer 111 outputs the symbol sequence signal to the communications channel 120.

The frequency synthesizer 109 is in communication with mixer 111 and code generator 107. The frequency synthesizer outputs a carrier frequency for a hopset to the mixer 111. The carrier frequency for the hopset is used by mixer 111 to determine a frequency-hopping pattern for the modulate signal output from the modulator 105. The carrier frequency in the hopset is determined based on a code segment output by the code generator 107.

The frequency synthesizer 109 receives the code segment from the code generator 107. The code generator 107 determines a pseudorandom code to supply as input to the frequency synthesizer 109. The pseudorandom code defines the hopset. In some embodiments, the code generator 107 can receive as input a secret key and a number from a number generator (such as a time-of-day clock) to generate the pseudorandom code. In such instances, the frequency synthesizers 109 and code generator 107 of the transmitter 110 can be identical to a transmit frequency synthesizer 139 and a code generators 137 of the receiver 130 so that the transmitter 110 and receiver 130 use an identical key (e.g., a shared private key).

In operation, the transmitter 110 receives the input signal. The transmitter 110 codes the input signal into a symbol sequence signal. In some embodiments, the transmitter 110 can include an encoder (not shown) that produces the symbol sequence signal based on the input signal and/or predefined parameters. In some embodiments, the transmitter 110 receives the input signal is the symbol sequence signal. The transmitter 110 transmits the symbol sequence signal through communications channel 120 to receiver 130.

In some embodiments, the transmitter 110 transmits the symbol sequence signal as a spread-spectrum signal having a frequency hopping pattern within a specified hopband. For example, the communication system can function with each sub-band of 25 KHz hopping over numerous such sub-bands in the wide band of 30-60 MHz.

In some embodiments, the communications system 100 has multiple transmitters 110 that send signals to receiver 130, such as in a multiple-input, single-output (MISO) system.

In some embodiments, the transmitter 110 employs modulation and frequency-hopping techniques in concert to send to the receiver 130. For example, the transmitter 110 can employ phase-shift keying (e.g., QPSK or 8-PSK) to alter the phase of the input signal, while at the same time, set a carrier frequency in the hopset, such that transmitter 110 can send copies of the spread-spectrum signal sent at the chosen carrier frequency within the hopset at different phases for a specified time (dwell time) before hopping to another carrier frequency in the hopset based on the chosen frequency-hopping pattern.

The communications channel 120 is in communication with the transmitter 110 and the receiver 130. The communications channel 120 can be any wired or wireless communication mechanism know in the art. For example, the communications channel 120 can be a "WiFi" communication channel having a frequency range, such as 2412-2484 MHz.

The communications channel 120 can add noise to the signals transmitted from the transmitter 110. Communication channel 120 can also receive noise, such as additive white Gaussian noise (AWGN) as an additional input (not shown) to the signals sent from transmitter 110. The additive noise in the communications channel 120 can degrade the signal. In some embodiments, the noise added to the signal in communications channel 120 is random and independent, changing the amplitude and phase of the originally-sent signal. In some embodiments, third parties can use devices such as interceptors or frequency jammers to interfere with communications between transmitter 110 and receiver 130.

The receiver 130 is in communication with the communications channel 120. The receiver includes a mixer/divider 131, a filter 134, a demodulator 135, a synchronization circuit 136, a code generator 137, and a frequency synthesizer 139. The components of receiver 130 can be hardware such as individual processors, semiconductors, field-programmable gate arrays (FPGAs), application-specific integrated circuits (ASICs) and/or other circuits. The receiver 130 can be a mobile or fixed communications device (e.g., an antenna, phone, computer, satellite, etc.). The receiver 130 can be any receiver known in the art.

The mixer/divider 131 is in communication with communications channel 120, frequency synthesizer 130 and filter 134. The mixer/divider 131 receives as input as signal from the communications channel 120 and a frequency from the frequency synthesizer 130.

The frequency synthesizer 130 is in communication a code generator 137 and a synchronization module 136. The frequency synthesizer 130 outputs a carrier frequency for a hopset to the mixer 131. The carrier frequency for the hopset can be based on output from the synchronization module 136, output from the code generator 137, and/or identical to the carrier frequency for the hopset determined by the frequency synthesizer 109 in the transmitter 110.

The frequency synthesizer 139 receives the code segment from the code generator 137. The code generator 137 can determine a pseudorandom code to supply as input to the frequency synthesizer 139. The pseudorandom code defines the hopset. In some embodiments, the code generator 137 can receive as input a secret key and a number from a number generator (such as a time-of-day clock) to generate the pseudorandom code. In some embodiments, the code generator 137 generates a code identical to the code generated by the code generator 107 of the receiver. In some embodiments, the transmitter 110 and receiver 130 use an identical key (e.g., a shared private key).

The filter 134 is in communication with the mixer divider 131 and the synchronization circuit 136. The mixer/divider 131 removes the frequency hopping pattern (using a frequency from frequency generator 139 as an input). The filter 134 receives the de-mixed signal and can remove extraneous elements from the signal, such as double frequency components and/or power outside the intended carrier frequency. In some embodiments, filter 134 is a bandpass filter that produces a dehopped signal for demodulator 135 and synchronization circuit 136.

The demodulator 135 is in communication with the filter 134 and synchronization circuit 136. The demodulator 135 extracts the symbol sequence signal from the dehopped signal received from the filter 133. The demodulator 135 can employ techniques for demodulation that are capable of demodulating the modulated signals. For example, if transmitter 110 includes a modulator 105 that uses QPSK for modulating the spread-spectrum signal it transmits, receiver 130 includes a demodulator 135 that uses QPSK to demodulate received copies of the spread-spectrum signal.

The synchronization module 136 is in communication with the communications channel 120, the demodulator 135, filter 134, and the code generator 137. The synchronization module 136 synchronizes the frequency hopping pattern of received copies of the symbol sequence signal. For example, the synchronization circuit 136 can receive a dehopped signal from filter 134 and the spread-spectrum signal from the communications channel 120 as input and output control signals to the demodulator 135 and the code generator 137.

In some embodiments, the receiver 130 can receive multiple copies of the same symbol sequence signal segment and combine the copies to efficiently determine the data component of the segment. In such instances, combining multiple copies of the same segment can eliminate the effects of noise, fading, and intentional interference experienced by the symbol sequence signal segment when traveling through communication channel 120.

In some embodiments, the receiver 130 can receive the symbol sequence signal as a spread-spectrum signal at a specific carrier frequency within a frequency-hopping pattern used by transmitter 110. In some embodiments, the receiver 130 receives low-rate codes as known in the art.

In some embodiments, the receiver 130 can also include a decoder (not shown). The decoder can receive the recovered symbol sequence output by demodulator 135 to determine the information stored in the symbol sequence. For example, receiver 110 can include a decoder to decode the symbol sequence signal employing decoding techniques to decode signals encoded based on, such as, Reed-Solomon (RS) codes, Forward Error Correction (FEC) codes, Viterbi codes, turbo codes, and Low-Density Parity Codes (LPDC). In some embodiments, the decoder receives the symbol sequence as specific values (i.e., hard-decision detection), while in other embodiments, the decoder receives the symbol sequence as Log Likelihood Ratios (LLRs) for individual bits in the symbol sequence (i.e., soft-decision detection).

Figure 2:
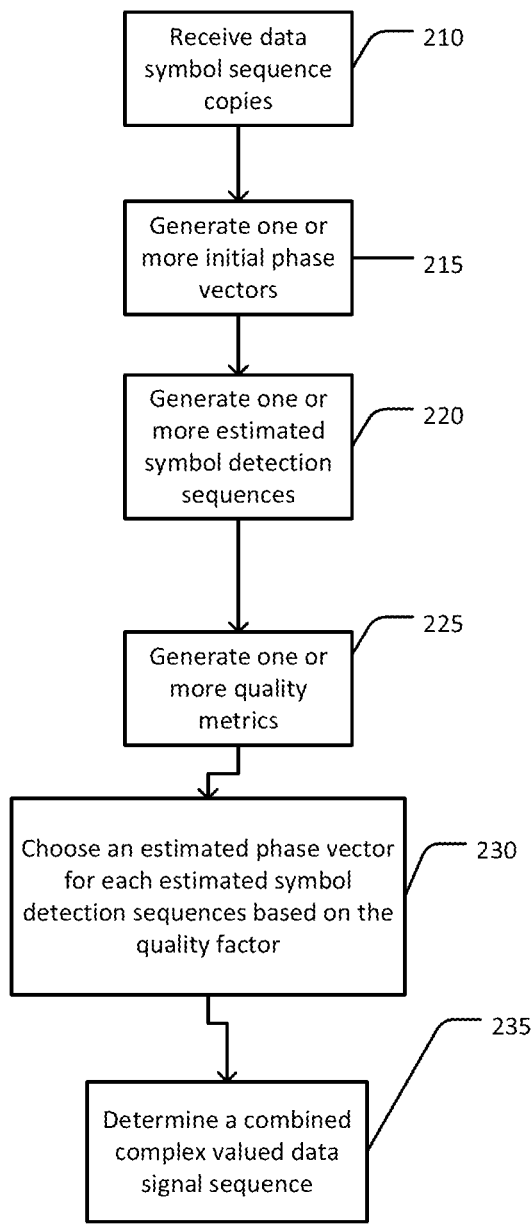
FIG. 2 illustrates an exemplary method for detecting a symbol sequence from received copies of a signal sequence according to an illustrative embodiment of the technology.

FIG. 2 illustrates an exemplary method 200 for detecting a symbol sequence signal from a plurality of received copies of a symbol sequence transmitted over a wireless communications channel, according to an illustrative embodiment of the technology.

The method involves receiving a data symbol sequence and one or more of copies of the symbol sequence (Step 210) (e.g., receiving by receiver 130, as described above in FIG. 1). The received data symbol sequence and the copies of the data symbol sequence can be referred to generally as data symbol sequence copies. The data symbol sequence copies each include a data signal, a reference signal, and noise. The data signal can be one or more data symbols and one or more data-symbol phase angles. The data signal can be a complex number. For example, a data symbol sequence having 100 data signals can be transmitted four times. In this example, there are four data symbol sequences (one original and three copies) and 400 data signals in total.

Each copy of the data symbol sequence is substantially identical to the original data symbol sequence, except for the noise and except for an unknown phase shift. For example, the receiver can receive a data symbol sequence of a spread-spectrum signal and three copies, each of the data symbol sequence and the three copies can have independent phase shifts and AWGN.

Detecting a symbol sequence signal can include determining a globally optimal phase shift vector φ and a corresponding symbol detection sequence {θ}. The globally optimal phase shift vector φ and the corresponding symbol detection sequence {θ} can be determined by maximizing:

$$\max_{\varphi,\{\theta\}} f(a,b,s,t,\varphi,\theta) = \max_{\varphi,\{\theta\}} \sum_{j=1}^{c} \left[ \left\{ \sum_{i=1}^{n} a_{ij}\cos(\varphi_j - b_{ij} + \theta_i) \right\} + \left\{ \sum_{i=1}^{r} s_{ij}\cos(\varphi_j - t_{ij}) \right\} \right].$$

EQN. 1 where c is the number of copies, n is the number of data symbols in the symbol sequence, r is the number of reference symbols for a total of n+r symbols in the sequence of symbols transmitted $a_{ij}$ is the magnitude of the i-th data symbol in the j-th received copy, $b_{ij}$ is the phase angle of the i-th data symbol in the j-th received copy, $\phi_j$ is the unknown phase shift of the j-th copy, $s_{ij}$ is the magnitude of the i-th reference symbol in the j-th copy and $t_{ij}$ is the phase angle of the same. In the maximization, all possible decisions can be considered for each $\theta_i$. For example, for the QPSK modulation scheme, the possible values for each $\theta_i$ can be 0, $$\frac{\pi}{2},$$

π, $$\frac{3\pi}{2}$$

radians. In some embodiments, the magnitudes of the received copies of data signal sequences can be scaled differently prior to determining the phase shift vector. For example, the received signals can be first normalized to have the same statistical variance and the combining factors $\rho_j$ can be evaluated for maximal ratio combining as described in Linear Diversity Combining Techniques by D. G. Brennan, Proceedings of the IRE, June 1959, which in incorporated herein in its entirety. If $x_{ij}$, j=1, . . . , c and i=1, . . . , n are the magnitudes of the received data signals and $y_{ij}$, j=1, . . . , c and i=1, . . . , r are the magnitudes of the received reference signals, the normalized signal magnitudes to be used in EQN. 1 can be obtained as $$a_{ij} = \rho_j x_{ij}, j=1, \ldots, c \text{ and } i=1, \ldots, n$$

and $$s_{ij} = \rho_j y_{ij}, j=1, \ldots, c \text{ and } i=1, \ldots, r$$

Determining the globally optimal phase shift vector $\phi$ by maximizing EQN. 1 shown above can involve a computationally intensive number of options to consider. In some embodiments, the globally optimal phase shift vector $\phi$ can be determined by approximating the maximization of EQN. 1 above.

Approximating the maximization of EQN. 1 can involve generating one initial phase vector for each data symbol (Step 215). For example, for a data symbol sequence having one hundred data symbols transmitted four times (e.g., one original and three copies), one hundred initial phase vectors are generated.

In some embodiments, each initial phase vector can be determined by selecting an optimum phase vector from a list of potential initial phase vectors. Each initial phase vector in the list of potential initial phase vectors can be determined by maximizing:

$$h_i = \max_{\varphi_{ij}, \theta_k} \sum_{j=1}^{c} \left\{ a_{ij}\cos(\varphi_{ij} - b_{ij} + \theta_k) + \sum_{l=1}^{r} s_{ij}\cos(\varphi_{ij} - t_{lj}) \right\} \quad \text{EQN. 2}$$

EQN. 2 can be expressed as a linear combination of $\cos(\phi_{ij})$ and $\sin(\phi_{ij})$ as follows:

$$h_{ik} = \sum_{j=1}^{c} \left\{ a_{ij}\cos(\varphi_{ijk} - b_{ij} + \theta_k) + \sum_{l=1}^{r} s_{ij}\cos(\varphi_{ijk} - t_{lj}) \right\} \quad \text{EQN. 3}$$

$$= \sum_{j=1}^{c} \cos(\varphi_{ijk}) \left( a_{ij}\cos(b_{ij} - \theta_k) + \sum_{l=1}^{r} s_{ij}\cos(t_{lj}) \right) + \quad \text{EQN. 4}$$

$$\sin(\varphi_{ijk}) \left( a_{ij}\sin(b_{ij} - \theta_k) + \sum_{l=1}^{r} s_{ij}\sin(t_{lj}) \right)$$

In some embodiments, an intermediate parameter $\psi_k$ is determined as follows:

$$\cos(\psi_{ijk}) = \frac{A_{ijk}}{C_{ijk}}, \text{ and} \quad \text{EQN. 5}$$

$$\sin(\psi_{ijk}) = \frac{B_{ijk}}{C_{ijk}}. \quad (20)$$

where $A_{ijk}$ are intermediate parameters, $B_{ijk}$ are intermediate parameters, and $C_{ijk}$ are intermediate parameters. In some embodiments, the intermediate parameters $A_{ijk}$ are determined as follows:

$$A_{ijk} = \left( a_{ij}\cos(b_{ij} - \theta_k) + \sum_{l=1}^{r} s_{ij}\cos(t_{lj}) \right), \quad \text{EQN. 6}$$

In some embodiments, the intermediate parameters $B_{ijk}$ are determined as follows:

$$B_{ijk} = \left( a_{ij}\sin(b_{ij} - \theta_k) + \sum_{l=1}^{r} s_{ij}\sin(t_{lj}) \right), \quad \text{EQN. 7}$$

In some embodiments, the intermediate parameters $C_{ijk}$ are determined as follows:

$$C_{ijk} = \sqrt{A_{ijk}^2 + B_{ijk}^2}, \quad \text{EQN. 8}$$

In some embodiments, applying EQNs 5-8 to EQN. 3 results in:

$$h_{ik} = \sum_{j=1}^{c} C_{ijk}\cos(\varphi_{ijk} - \psi_{ijk}), \quad \text{EQN. 9}$$

$$h_i = \max_{\varphi_{ij,k}} \sum_{j=1}^{c} C_{ijk}\cos(\varphi_{ijk} - \psi_{ijk}). \quad \text{EQN. 10}$$

In some embodiments, the j-th component of the initial phase vector corresponding to data symbol i can be determined as follows:

$$\phi_{ij} = \psi ijk^*. \quad \text{EQN. 11}$$

where k* is the value of k that maximizes the argument of EQN. 10. For example, for k between 1 and 10, k* is the k value between 1 and 8 that maximizes EQN. 10. In some embodiments, each initial phase shift vector is determined by:

$$\Phi_i = (\phi_{i1}, \ldots, \phi_{ic}), i=1, \ldots, n. \quad \text{EQN. 12}$$

where c is the number of copies of the signal sequence and i is the position of the data signal for which the initial phase shift vector $\Phi_i$ is evaluated in EQN. 12

The method also involves determining an estimated symbol detection sequence for each initial phase vector (Step 220). For example, for signal sequence copies, each copy having one data signal, one hundred initial phase shift vectors are determined. For each initial phase shift vector, a corresponding estimated symbol detection sequence can be determined, thus, in this example, one hundred estimated symbol detection sequences are determined. In some embodiments, each estimated symbol detection sequence is determined by:

$$f_k(\Phi_i, \chi_{ik}) = \max_{\theta_k} \sum_{j=1}^{c} a_{kj}\cos(\varphi_{ij} - b_{kj} + \theta_k). \quad \text{EQN. 13}$$

where k is the position of the data signal for which the detection is being estimated using the initial phase vector $\Phi_i$ and the maximization is carried out over all possible values of $\theta_k$ and $\chi_{ik}$ is the value of $\theta_k$ that maximizes the right hand side of EQN. 13. $\chi_{ik}$ can be the estimated symbol decision (or detection) for the data symbol position k using the initial phase vector $\Phi_i$.

The method also involves generating a quality metric for each symbol sequence detection (Step 225). In some embodiments, the quality metric for each symbol sequence is determined by maximizing EQN. 14:

$$f(\varphi) = \sum_{j=1}^{c} \left\{ \cos(\varphi_j) \left[ \sum_{i=1}^{n} a_{ij}\cos(b_{ij} - \theta_i) + \sum_{i=1}^{r} s_{ij}\cos(t_{ij}) \right] + \sin(\varphi_j) \left[ \sum_{i=1}^{n} a_{ij}\sin(b_{ij} - \theta_i) + \sum_{i=1}^{r} s_{ij}\sin(t_{ij}) \right] \right\}.$$ EQN. 14 with respect to the variable phase shift vector $\varphi$ where $a_{ij}$, $b_{ij}$, $s_{ij}$, $t_{ij}$ are values of received signals as defined above, $\theta_i$ is the estimated detection of in the i-th data signal position, and $\varphi_j$ is the j-th component of $\varphi$.

In some embodiments, an intermediate parameter $\psi_j$ is determined as follows:

$$\sin(\psi_j) = \frac{B_j}{C_j}, \text{ and}$$ EQN. 15

$$\cos(\psi_j) = \frac{A_j}{C_j}.$$ EQN. 16 where $A_j$ is an intermediate parameter, $B_j$ is an intermediate parameter and $C_j$ is an intermediate parameter. In some embodiments, the intermediate parameter $A_j$ is determined as follows:

$$A_j = \left[ \sum_{i=1}^{n} a_{ij}\cos(b_{ij} - \theta_i) + \sum_{i=1}^{r} s_{ij}\cos(t_{ij}) \right],$$ EQN. 17

In some embodiments, the intermediate parameter $B_j$ is determined as follows:

$$B_j = \left[ \sum_{i=1}^{n} a_{ij}\sin(b_{ij} - \theta_i) + \sum_{i=1}^{r} s_{ij}\sin(t_{ij}) \right],$$ EQN. 18

In some embodiments, the intermediate parameter $C_j$ is determined as follows:

$$C_j = \sqrt{A_j^2 + B_j^2},$$ EQN. 19

In some embodiments, $\Sigma_{j=1}^{c} C_j$ is the quality metric for the estimated detection sequence. In the example of one hundred data symbols and four copies, there are one hundred quality metric values.

The method also involves selecting the estimated symbol detection sequence and the phase shift vector that has the highest quality factor among all the quality factors (Step 230). Selecting the estimated symbol detection sequence can involve choosing an estimated phase vector for each of the estimated symbol detection sequence. In some embodiments, the estimated phase vector for the estimated symbol detection sequence is determined by selecting:

$$\phi^*_j = \psi_j, j=1,\ldots,c.$$ EQN. 21 where $\phi^*_j$ is the estimated phase shift value for the j-th of the c copies. The estimated phase shift vector for the estimated symbol sequence under consideration is the vector of these values, and can be denoted as follows:

$$\phi^* = [\phi^*_1, \ldots, \phi^*_c]$$ EQN. 22

The estimated phase shift vector along with its quality factor for each estimated symbol detection sequence is determined. In the example of one hundred data symbols and four copies of signal sequences, there are one hundred estimated detection sequences, each with its own quality factor and its own estimated phase shift vector.

The method also involves determining a combined complex valued data signal sequence (Step 235). The combined complex valued data signal sequence can be determined as follows:

$$z_k = \sum_{j=1}^{c} a_{kj}[\cos(b_{kj} - \varphi_j) + i\sin(b_{kj} - \varphi_j)]$$ EQN. 23 where $z_k$ is the combined complex signal for the k-th of the n data symbols, $a_{kj}$ and $b_{kj}$ are the magnitude and phase angle of the j-th copy of the k-th of the n data signals, $\varphi_j$ is the estimated phase shift for the j-th copy with the highest quality factor, and $$i = \sqrt{-1}$$

is the unit imaginary number.

In some embodiments, the combining is done based on a weighted sum. The weighted sum can be determined as follows:

$$z_k = \sum_{j=1}^{c} \eta_j a_{kj}[\cos(b_{kj} - \varphi_j) + i\sin(b_{kj} - \varphi_j)]$$ EQN. 24 where the weighting factor for the j-th copy is $\eta_j$.

Figure 3:
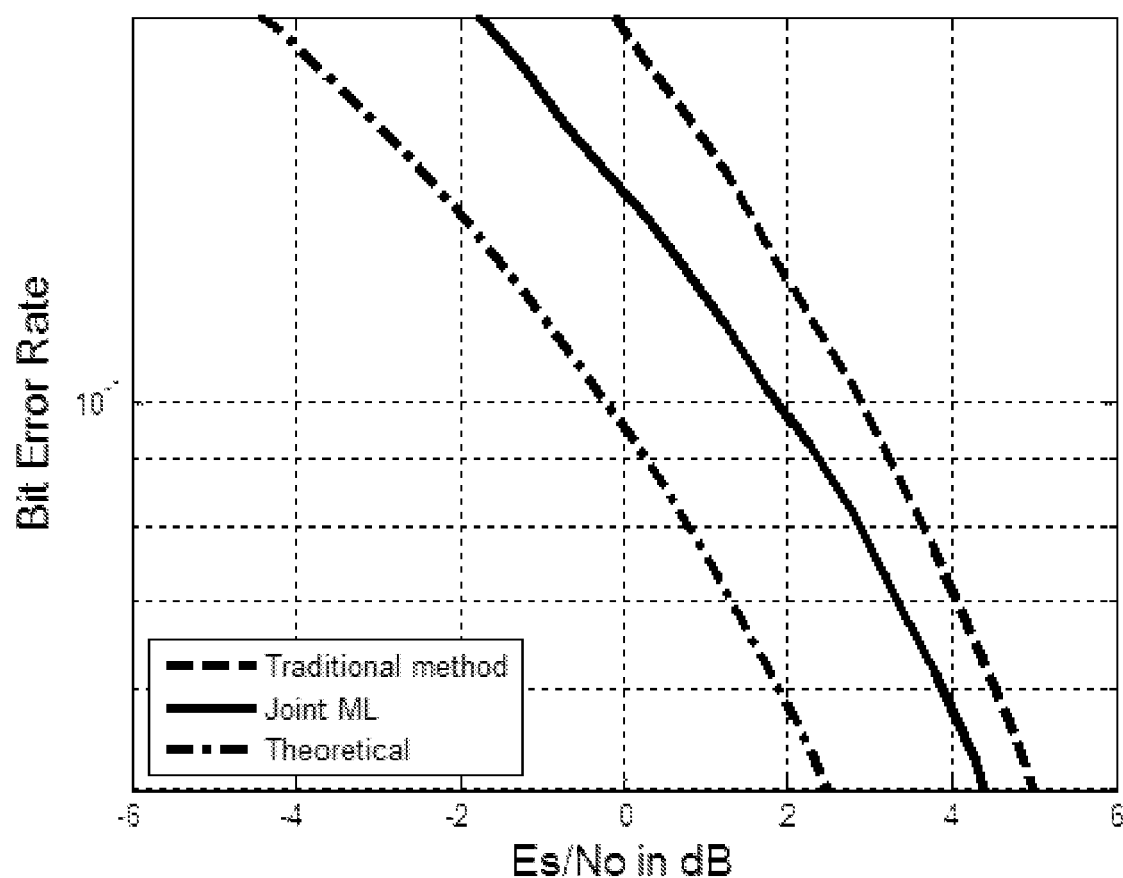
FIG. 3 is a graph showing exemplary results for bit error rates (BER) versus the signal-to-noise ratios (SNR) for a receiver, according to an illustrative embodiment of the technology.

FIG. 3 shows a graph 300 of bit error rates (BER) versus signal-to-noise ratios (SNR) for a detector, according to illustrative embodiments of the technology. The SNR used here is the symbol energy per unit noise power spectral density, denoted by Es/No. The BER for four copies, 8-PSK modulations, and two (2) reference symbols and twelve (12) data symbols in each copy, denoted by 2+12 is shown for typical prior art method, for the method according to an exemplary embodiments of the invention, and a coherent theoretical approach. The coherent theoretical approach can be applicable if, for example, there are no unknown phase shifts and if the receiver can take advantage of it.

Figure 4:
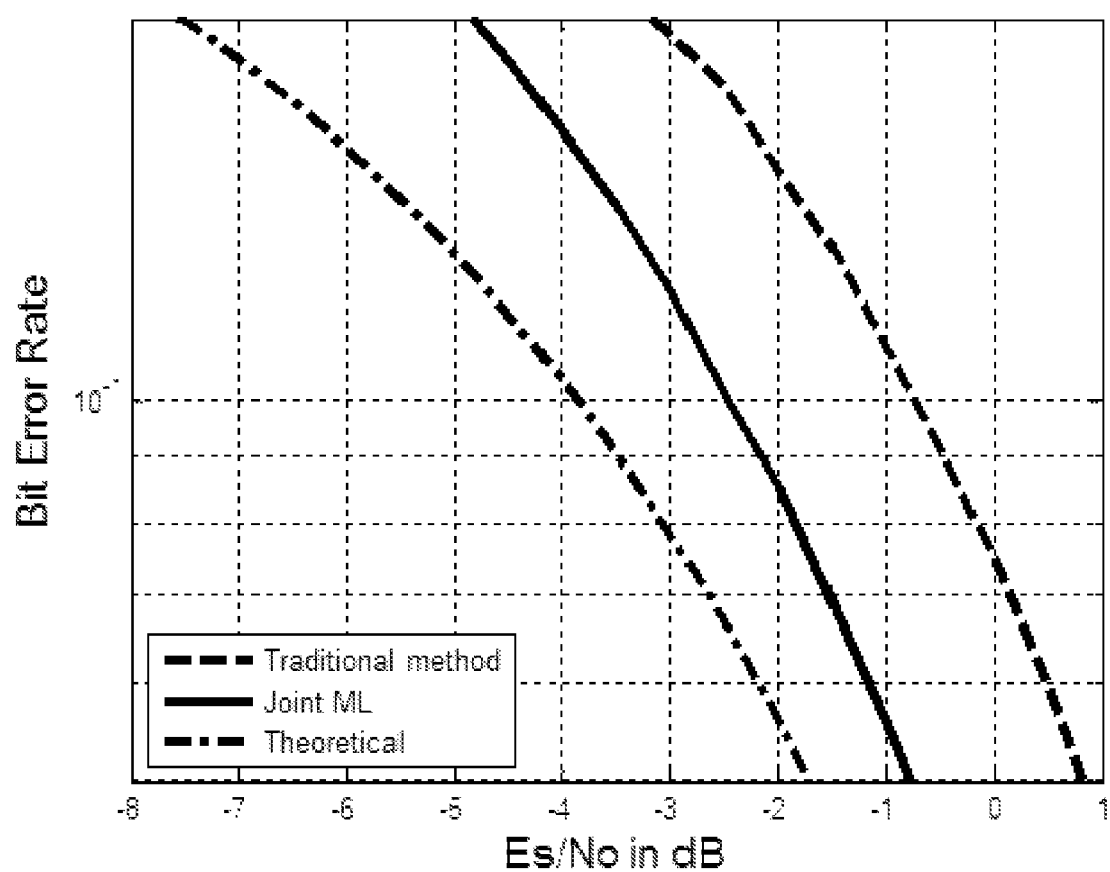
FIG. 4 is a graph showing exemplary results for bit error rates (BER) versus the signal-to-noise ratios (SNR) for a receiver, according to an illustrative embodiment of the technology.

FIG. 4 shows a graph 400 of bit error rates (BER) versus signal-to-noise ratios (SNR) for a detector, according to illustrative embodiments of the technology. The SNR in FIG. 4 is the symbol energy per unit noise power spectral density, denoted by Es/No. The BER for four copies, QPSK modulations, and three (3) reference symbols and fifty four (54) data symbols in each copy, denoted by 3+54 is shown for typical prior art method, for the method according to an exemplary embodiment of the invention, and a coherent theoretical approach. The coherent theoretical approach can be applicable if, for example, there are no unknown phase shifts and if the receiver can take advantage of it.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method of detecting a data symbol sequence transmitted over a wireless communications channel, the method comprising:
   receiving, by a detector in a receiver, a plurality of data symbol sequence copies, each data symbol sequence copy comprising:
      a data signal sequence including a plurality of data symbols and a data-symbol phase angle,
      a reference signal including at least one reference symbol; and
      noise and an unknown phase shift, wherein the data signal sequence is approximately identical for each copy and the unknown phase shift unknown for each copy;
   generating, by the detector, an initial phase vector for each data signal in the plurality of data signal sequence copies, each initial phase vector is based on the plurality of data signal sequence copies;
   generating, by the detector, an estimated symbol detection for each data signal in each of the plurality of data symbol sequence copies, each estimated symbol detection sequence is based on a corresponding initial phase vector;
   generating, by the detector, a quality value for each estimated symbol detection sequence;
   selecting, by the detector, a global estimated phase vector, the global estimated phase vector is the estimated phase vector for the estimated symbol detection sequence having a quality value that is the highest of all quality values; and
   detecting, by the detector, the data symbol sequence by:
      a) phase shifting each of the plurality of data symbol sequence copies based on the global estimated phase vector, and
      b) combining each of the phase shifted plurality of data signal sequence copies to obtain the data symbol sequence.

2. The method of claim 1, further comprising:
   iteratively updating each estimated symbol detection sequence and each estimated phase vector until each estimated phase vector is identical to a corresponding estimated phase vector of an earlier iteration.

3. The method of claim 1, wherein the data symbol sequence comprises a repeat code from
   one transmitter.

4. The method of claim 3, wherein the data symbol sequence comprises a one-hop portion
   of a signal transmitted over a frequency-hopping communications channel.

5. The method of claim 1, wherein the detector comprises a field-programmable gate array.

6. The method of claim 1, wherein the data symbol sequence comprises a repeat code from
   multiple transmitters.

7. The method of claim 1, wherein a bit error rate of the global estimated symbol detection sequence is below lo-s.

8. The method of claim 1, further comprising:
   decoding, by a decoder receiving the combined symbol sequence from the detector, the combined symbol sequence using hard decision decoding.

* * * * *